(12) United States Patent
Birkler et al.

(10) Patent No.: US 10,719,386 B2
(45) Date of Patent: *Jul. 21, 2020

(54) METHOD FOR FAULT HANDLING IN A DISTRIBUTED IT ENVIRONMENT

(71) Applicant: INTERNATIONAL BUSINESS MACHINES CORPORATION, Armonk, NY (US)

(72) Inventors: Khirallah Birkler, Bad Saulgau (DE); Martin Oberhofer, Bondorf (DE); Boris Feist, Ehningen (DE); Torsten Wilms, Altdorf (DE)

(73) Assignee: International Business Machines Corporation, Armonk, NY (US)

( * ) Notice: Subject to any disclaimer, the term of this patent is extended or adjusted under 35 U.S.C. 154(b) by 151 days.

This patent is subject to a terminal disclaimer.

(21) Appl. No.: 15/895,543

(22) Filed: Feb. 13, 2018

(65) Prior Publication Data

US 2018/0173586 A1    Jun. 21, 2018

Related U.S. Application Data

(63) Continuation of application No. 14/817,019, filed on Aug. 3, 2015, now Pat. No. 9,959,160, which is a (Continued)

(30) Foreign Application Priority Data

Jun. 27, 2011   (DE) .................................. 11171572

(51) Int. Cl.
*G06F 11/07* (2006.01)
*H04L 12/24* (2006.01)
(Continued)

(52) U.S. Cl.
CPC ...... *G06F 11/0793* (2013.01); *G06F 11/0703* (2013.01); *G06F 11/0709* (2013.01);
(Continued)

(58) Field of Classification Search
CPC .............. G06F 11/0793; G06F 11/079; G06F 11/0709; G06F 11/0703; G06F 11/36;
(Continued)

(56) References Cited

U.S. PATENT DOCUMENTS 7,194,744 B2     3/2007  Srivastava et al.
7,308,610 B2 *  12/2007  Kuramkote ........... G06F 11/366
                                                      714/38.13
(Continued)

OTHER PUBLICATIONS

Introducing IBM WebSphere Service Registry and Repository, Part 2: Architecture, APIs and content. Sep. 29, 2006 [retrieved on Jun. 12, 2014] IBM. Retrieved from the Internet.

*Primary Examiner* — Paul Contino
(74) *Attorney, Agent, or Firm* — Scott S. Dobson

(57) ABSTRACT

An improved method provides fault handling in a distributed IT environment. The distributed IT environment executes a workflow application interacting with at least one application by using interface information about the at least one application. In response to receiving a first instance of a fault response, a fault handler performing a first lookup of a fault handling policy corresponding to the fault response within a fault handling descriptions catalogue. The fault handler loads a first one or more fault handling descriptions that are pointed to by the fault handling policy in order to continue execution of the workflow application. After a second instance of the fault response, the fault handler performs a second lookup of the fault handling policy which now points to a second one or more fault handling descriptions which are loaded in order to continue execution of the workflow application.

15 Claims, 6 Drawing Sheets

Related U.S. Application Data continuation of application No. 13/781,599, filed on Feb. 28, 2013, now Pat. No. 9,208,014, which is a continuation of application No. 13/532,915, filed on Jun. 26, 2012, now Pat. No. 9,201,723.

(51) Int. Cl.
    *G06Q 10/06*     (2012.01)
    *G06Q 10/10*     (2012.01)
    *G06F 11/36*     (2006.01)

(52) U.S. Cl.
    CPC ............ *G06F 11/079* (2013.01); *G06F 11/36* (2013.01); *G06F 11/3604* (2013.01); *G06F 11/3668* (2013.01); *H04L 41/0893* (2013.01); *H04L 41/5045* (2013.01); *G06Q 10/06* (2013.01); *G06Q 10/103* (2013.01)

(58) Field of Classification Search
    CPC ............. G06F 11/3668; G06F 11/3604; H04L 41/0893; H04L 41/5045
    See application file for complete search history.

(56) References Cited

U.S. PATENT DOCUMENTS

| | | | |
|---|---|---|---|
| 7,475,275 | B2 | 1/2009 | Chafle et al. |
| 2003/0149919 | A1 | 8/2003 | Greenwald et al. |
| 2004/0025148 | A1 | 2/2004 | Krueger |
| 2004/0078683 | A1 | 4/2004 | Buia et al. |
| 2006/0160529 | A1* | 7/2006 | Glass ........................ G06F 8/61 |
| | | | 455/418 |
| 2006/0248406 | A1 | 11/2006 | Qing et al. |
| 2008/0010564 | A1 | 1/2008 | Chrysanthakopoulos et al. |
| 2008/0189534 | A1 | 8/2008 | Jeng et al. |
| 2008/0244337 | A1 | 10/2008 | Breiter et al. |
| 2009/0037574 | A1 | 2/2009 | Machida |
| 2010/0161632 | A1* | 6/2010 | Rosen ................. G06F 9/44526 |
| | | | 707/758 |
| 2010/0211815 | A1 | 8/2010 | Mankovskii et al. |
| 2010/0269091 | A1 | 10/2010 | Barnes et al. |
| 2011/0219375 | A1 | 9/2011 | Chang et al. |
| 2013/0340035 | A1* | 12/2013 | Uziel .................... G06Q 10/06 |
| | | | 726/1 |

\* cited by examiner

METHOD FOR FAULT HANDLING IN A DISTRIBUTED IT ENVIRONMENT

US PRIORITY CLAIM

The present application is a continuation of U.S. patent application Ser. No. 14/817,019, filed on Aug. 3, 2015, which is a continuation of U.S. patent application Ser. No. 13/781,599, filed on Dec. 8, 2015, now U.S. Pat. No. 9,208,014, issued on Dec. 8, 2015, which is a continuation of U.S. patent application Ser. No. 13/532,915, now U.S. Pat. No. 9,201,723, issued Dec. 1, 2015, the contents of which are incorporated herein by reference in their entirety.

FOREIGN PRIORITY CLAIM

The present application claims benefit of priority under 35 USC § 120 and § 365 to the previously filed Germany Patent Application No. 11171572.8 titled, "Method and Arrangement for Fault Handling in a Distributed IT Environment", with a priority date of Jun. 27, 2011. The content of that application is incorporated by reference herein.

BACKGROUND OF THE INVENTION

Field of the Invention

The present invention relates in general to the field of distributed and heterogeneous enterprise application environment, and in particular to a method and an arrangement for fault handling in a distributed information technology (IT) environment. Still more particularly, the present invention relates to a data processing program and a computer program product for fault handling in a distributed IT environment.

Description of the Related Art

In a typical distributed and heterogeneous enterprise application environment, as it is common in many large companies, application integration of different software systems is a necessity to automate common workflows and processes of the business, and the integration thus enables the companies to become more efficient and competitive in the market.

Companies can distinguish themselves from their competitors by being more agile and adapting faster to changing market trends and legal or industrial regulations (e.g. auditability). In order to achieve such agility on a technical level it is important to be able to rapidly deploy new automated workflows and processes or to change existing workflows and processes.

Enterprise process modeling and development environments, such as WebSphere Integration Developer by International Business Machines, allow integration developers to use graphical tools to model, develop, and deploy business process applications in standardized ways and formats (such as business process execution language (BPEL) or business process model and notation (BPMN)) and to leverage standardized protocols (like SOAP, JMS, HTTP, JCA, etc.) and proprietary connectors to integrate with third party systems of different kinds.

While these mentioned standards as well as proprietary connectors usually detail the syntactical interfaces to third party systems, they often lack semantic context, like meanings of error conditions and how to deal with the error conditions under the given circumstances. However, this semantic information is needed by the integration developer to properly develop interactions with a system and to appropriately handle fault conditions. Another problem is that syntactical interfaces of systems do not tell the integration developer how to deal with system responses, in particular, in case of fault responses. Without additional specific documentation, two or more developers might take different implementation approaches to perform the same fault handling. The results are non-streamlined and hard-to-read code, redundancy, differences in the procedure of fault handling in various parts of the integration solution, and difficulties in keeping track of changes in the fault handling procedure. Further, in an integration application, fault handling requirements are often derived from the particular backend application, rather than only the interface or the class and/or type of system. The derivation is based on (a) system-uptimes and/or system-downtimes which require buffering of service requests and retrying, (b) availability of compensation services on backend, internal or external system, and (c) transactional capabilities or limitations of a system, for example. Also in an integration application, a fault in one system may have implications for the interaction with other systems. This is true for compensation logic or transaction management over multiple systems, and logical association of systems to each other, for example. A fault in system "A" can be remedied by an operation of system "B", whereas a fault in system "A'" must be corrected by an administrator, for example. Further, developers need to clarify semantics of fault handling for many systems with the respective subject matter experts or have detailed conventional documentation. This is very time-consuming in large appointment-driven companies as well as being error prone. Since fault handling logic is part of the modeling and/or development process and not a configuration task, a change or modification in the fault handling logic requires a change to the process model, too. Additionally, dynamic binding of new versions of the fault handling logic is currently not supported without bringing down the mediation modules running in an ESB, due to a lack of an abstraction language describing the fault handler interfaces.

Generation of fault handlers based on interface definition like Web Service Description Language Definitions (WSDLs) has long been available in development tools. Resulting fault handlers usually consist of a fault handling skeleton that needs further implementing or a relatively generic fault handling procedure based on the fault type.

In the Patent Publication U.S. Pat. No. 6,421,740 B1 "DYNAMIC ERROR LOOKUP HANDLER HIERACHY" by LeCroy, a method for processing a first error message to produce a second error message in a component-based architecture is disclosed. The component-based architecture includes a framework which is associated with a first lookup handler and is capable of embedding a first component associated with a first executable unit for handling data of the first component. The method includes the step of generating a hierarchy of lookup handlers, the hierarchy including the first lookup handler and a second lookup handler associated with the first executable unit when the first component comes into focus. Further, the method includes the step of processing the first error message through the hierarchy of lookup handlers to generate the second error message. Through the hierarchy, the first error message is first processed through the second lookup handler. If the second lookup handler is unable to process the first error message, the first error message is then processed through the first lookup handler. In this manner, the second error message is more specific to the first component than the first error message. Basically a method of transformation or resolution of error information based on less specific error information is disclosed. The method does this by dynamically installing and/or embedding and/or uninstalling handlers in an application.

Basically this patent publication describes a transformation or resolution of error information based on less specific error information. The publication does this by dynamically installing/embedding/uninstalling handlers in an application. However, the publication does not describe a method to apply error handling based on the error information. Furthermore, the publication does not use rules or policies to determine a course of action for a given error situation. It also lacks an abstraction layer in support for dynamic binding of either new error handlers or new versions of existing error handlers.

SUMMARY OF THE INVENTION

The technical problem underlying the present invention is to provide a method for fault handling in a distributed information technology (IT) environment, which are able to solve the above mentioned shortcomings and pain points of prior art fault handling in distributed IT environments.

According to the present invention this problem is solved by providing a method for fault handling in a IT environment having the features of claim 1, an arrangement for fault handling in a system having the features of claim 8, and a computer program product having the features of claim 15. Advantageous embodiments of the present invention are mentioned in the sub claims.

Accordingly, in an embodiment of the present invention, there is a method for fault handling in a IT environment having a workflow runtime environment that executes at least one workflow application interacting with at least one application by using interface information about the at least one application. The method comprises in response to receiving a first instance of a fault response from the at least one application, a fault handler performing a first lookup of a fault handling policy corresponding to the fault response within a fault handling descriptions catalogue of an externalized storage repository. The corresponding fault handling policy points to a first one or more fault handling descriptions. The fault handler loads the first one or more fault handling descriptions and using the first one or more fault handling descriptions to continue execution of the at least one workflow application. In response to receiving a second instance of the fault response from the at least one application, the fault handler performs a second lookup of the fault handling policy within the fault handling descriptions catalogue, wherein the fault handling policy has been updated within the fault handling descriptions catalogue, after the first lookup, to point to a second one or more fault handling descriptions. The fault handler then loads the second one or more fault handling descriptions and uses the second one or more fault handling descriptions to continue execution of the at least one workflow application.

In further embodiments of the present invention the method further comprises storing, within an enterprise systems registry of the externalized storage repository, the plurality of fault handling descriptions in an implementation-independent meta language, wherein the implementation-independent meta language describes the externalized storage repository, wherein the implementation-independent meta language is associated with the at least one application, and wherein the externalized storage repository is located external to the workflow application.

In further embodiments of the present invention the method further comprises associating the interface information about the at least one application with one or more of the plurality of fault handling descriptions based on the fault handling policy which is created based on at least one service definition, wherein the fault handling policy corresponds to a particular fault response, and wherein the fault handler may be changed at any time during a lifetime of the at least one workflow application and the at least one application without interrupting, modifying, redeploying, and restarting the at least one application and at least one workflow application.

In further embodiments of the present invention the method further comprises in response to loading the second one or more fault handling descriptions, dynamically loading one or more additional fault handlers from among: one or more updated versions of the fault handler and one or more entirely new fault handlers; and dynamically performing a self-adaptive selection of an externally defined fault handling logic described in one or more fault handling descriptions that are pointed to by the fault handling policy, wherein the fault handling logic comprises at least one fault handling procedure, wherein any changes to the at least one fault handling procedure are dynamically applied to all running process instances of the IT environment.

In further embodiments of the present invention the method further comprises adapting meta information of one or more fault handling descriptions that are pointed to by the fault handling policy to the workflow runtime environment in order to generate the fault handler, wherein the fault handler is executable and interpretable in a specific target platform language associated with the workflow runtime environment, and wherein the implementation-independent meta language is different from the specific target platform language.

In further embodiments of the present invention the interface information is associated with the at least one application without interrupting the at least one workflow application or the at least one application, wherein the fault handling policy is centrally defined and maintained in the fault handling descriptions catalogue for at least one of: single service operations and entire services, a class or type of same or similar enterprise information systems, and a particular enterprise information service.

In further embodiments of the present invention the method further comprises in response to receiving at least one policy change to the fault handling policy during runtime of the at least one workflow application, creating at least one modified fault handling policy that incorporates the at least one policy change into the fault handling policy and pointing the fault handling policy to the at least one modified fault handling policy within the fault handling descriptions catalogue, wherein the at least one modified fault handling policy points to the second one or more fault handling descriptions. In response to the fault handler performing the second lookup of the fault handling policy, the second one or more fault handling descriptions that are associated with the at least one modified fault handling policy are dynamically loaded.

In further embodiments of the present invention each fault handling policy is a property attached to a particular service interface and is created and maintained via a graphical user interface and associated application program interfaces (APIs) associated with the fault handling descriptions catalogue.

In the present disclosure a workflow application is a workflow capability which can reside within an application or external to the application in a dedicated workflow application, where known examples for the latter are enterprise business process platforms such as Web Sphere Process Server, etc.

All in all, embodiments of the present invention address the generation of fault handling logic in the context of the service of a particular system. The embodiments describe a method to generate a fault handler and a fault handling logic based on a central error processing definitions repository.

The core idea of the present invention is to use fault handling rules or policies to determine a course of action for a given error situation. Embodiments of the present invention are focused on fault handling in the business application integration field. Therefor embodiments of the present invention use (1) a generic fault handling description Meta language, (2) an externalized storage in a repository of a fault handling Meta model, described in the fault handling Meta language, and (3) fault handling policies, which are attached to service interfaces in a service registry, in order to associate service operations with application-specific and/or system-specific fault handling descriptions. Therefore, syntactical service interfaces are associated with particular fault handling Meta models in the repository, based on a combination of attributes. Further embodiments of the present invention use policy-based resolution and retrieval of pre-modeled, business application-specific fault handling description logic, and polymorphism of fault handling logic at runtime through dynamic (on demand) loading and interpretation of the fault handling descriptions, described in the meta language.

Embodiments of the present invention dynamically load fault handling descriptions into the workflow instance and allow polymorphism of fault handling logic through on-demand loading and interpreting of a fault handling Meta language at workflow runtime. Further the usage of the fault handling policies which are stored along with the interface information in the service registry allow fine-graining of the configurative association of service operations with particular fault handling procedures on a per-system or per-group of systems and/or applications basis, for example. Also embodiments of the present invention allow interpretation of dynamically retrieved fault handling description by interpreter code inside the workflow instance and do not interfere with the native, scoped fault handling architecture of a workflow platform, as they focus only on the fault handling logic for the particular fault and do not manage fault scopes.

One of the benefits of the present invention are fault handling policies which can be centrally defined and maintained for different scopes like single service operations or entire services, a class and/or type of same and/or similar enterprise information systems or a particular enterprise information system. A developer of integration application does not need the subject matter know-how for the implementation of the fault handling procedure; and all developers use the same fault handling strategy as defined by the applicable policy in their integration applications avoiding redundancy and hard-to-read code. Further, a change or correction that is applied to a fault handling procedure and stored in the fault handling descriptions catalog can be dynamically picked up by all process instances. Due to the externalization of fault handling logic there is no need to recompile and redeploy applications to implement a fault handling change, and dynamic fault handling description resolution at runtime allows for polymorphism of fault handling logic. Further the fault handling logic is changeable even for running process instances due to dynamic interpretation at runtime.

The above, as well as additional purposes, features, and advantages of the present invention will become apparent in the following detailed written description.

BRIEF DESCRIPTION OF THE DRAWINGS

Embodiments of the present invention, as described in detail below, are shown in the drawings, in which.

DETAILED DESCRIPTION OF THE PREFERRED EMBODIMENTS

Figure 1:
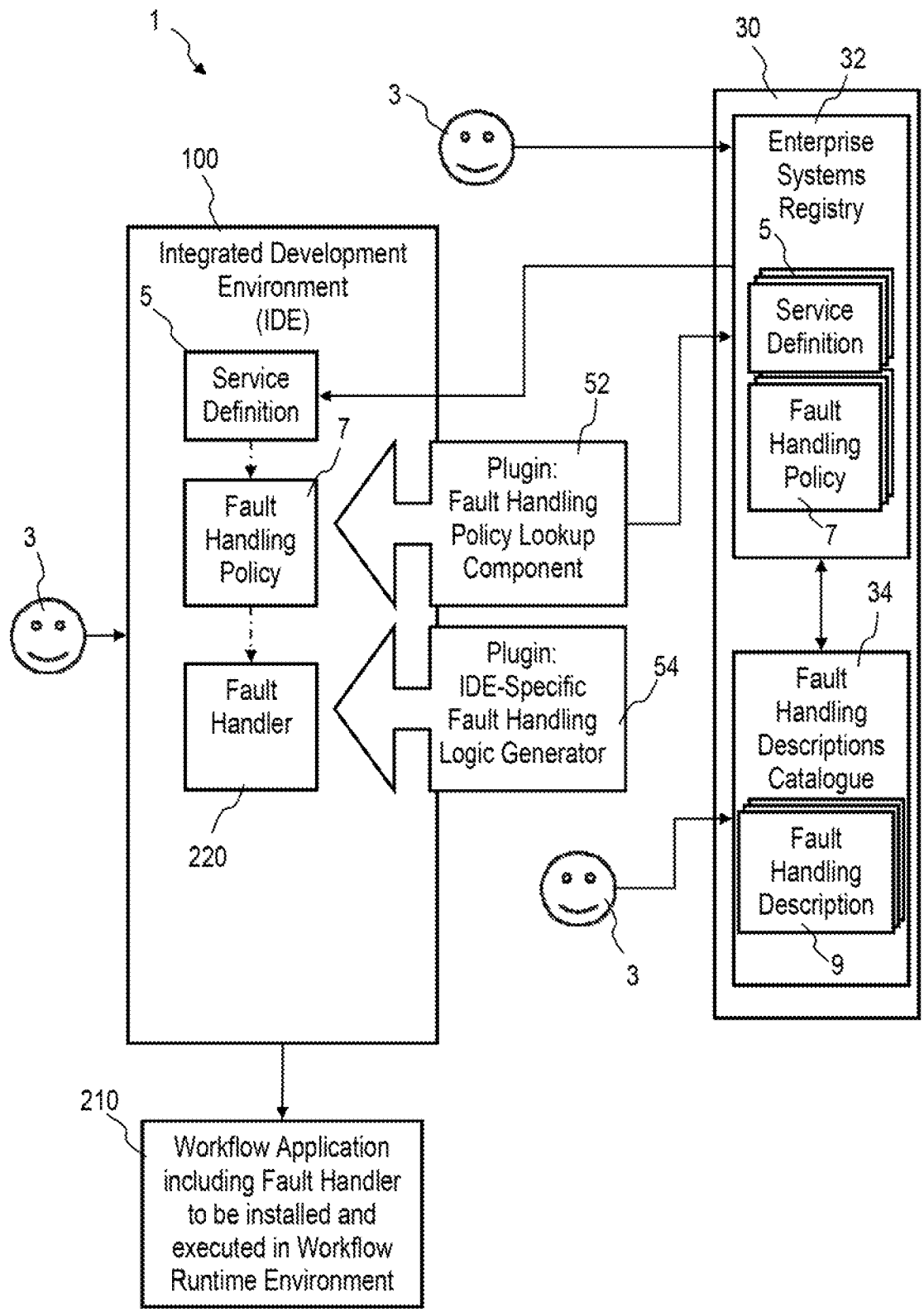
FIG. 1 is a schematic block diagram of interactions in an arrangement for fault handling in a distributed IT environment at development time, in accordance with an embodiment of the present invention.
Figure 2:
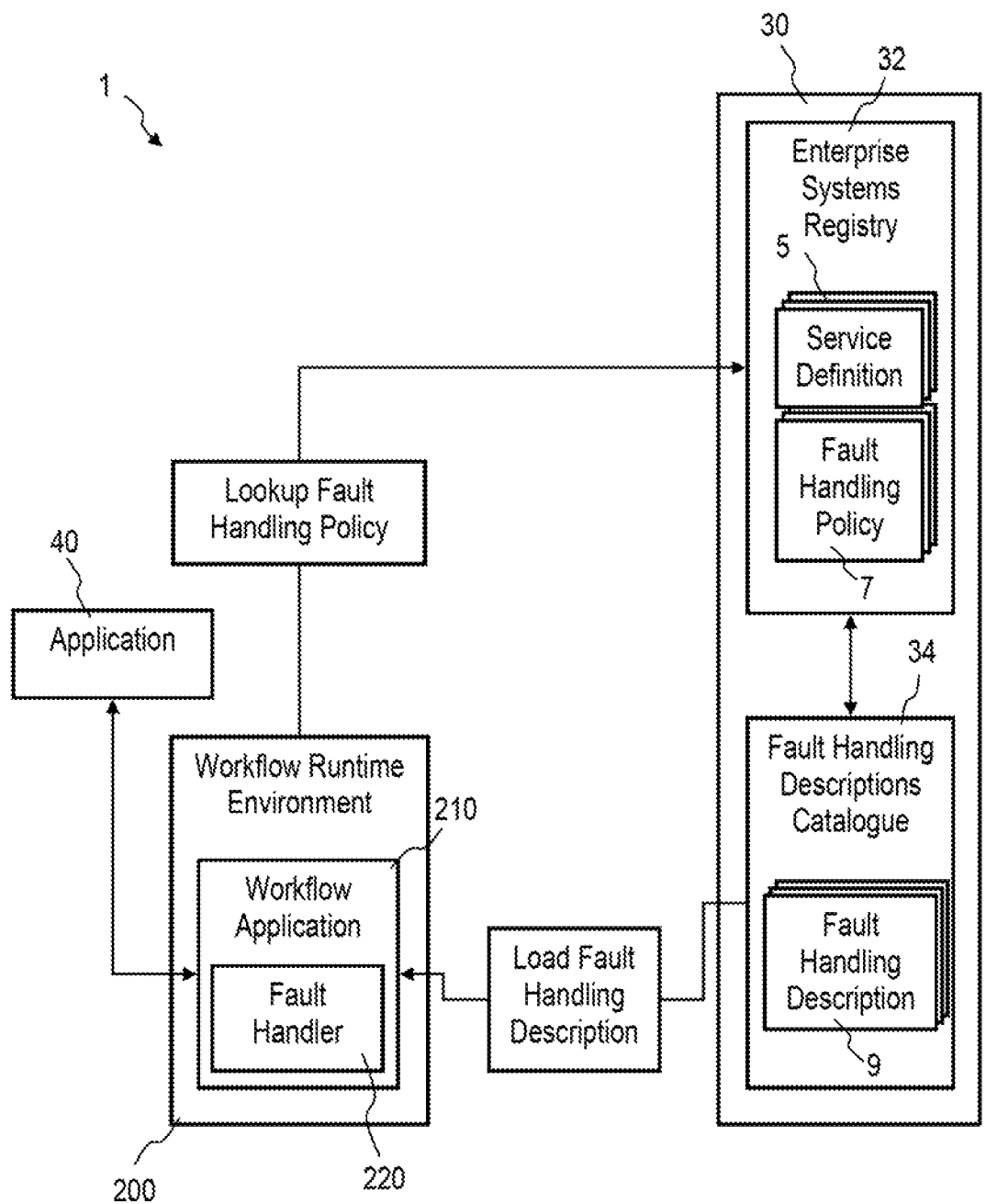
FIG. 2 is a schematic block diagram of interactions in an arrangement for fault handling in a distributed IT environment at runtime, in accordance with an embodiment of the present invention.

FIG. 1 shows interactions in an arrangement/system for fault handling in a distributed IT environment at development time, in accordance with an embodiment of the present invention; FIG. 2 shows interactions in an arrangement for fault handling in a distributed IT environment at runtime, in accordance with an embodiment of the present invention; and FIG. 3 shows a dynamic fault handling resolution at runtime, in accordance with an embodiment of the present invention.

Figure 3:
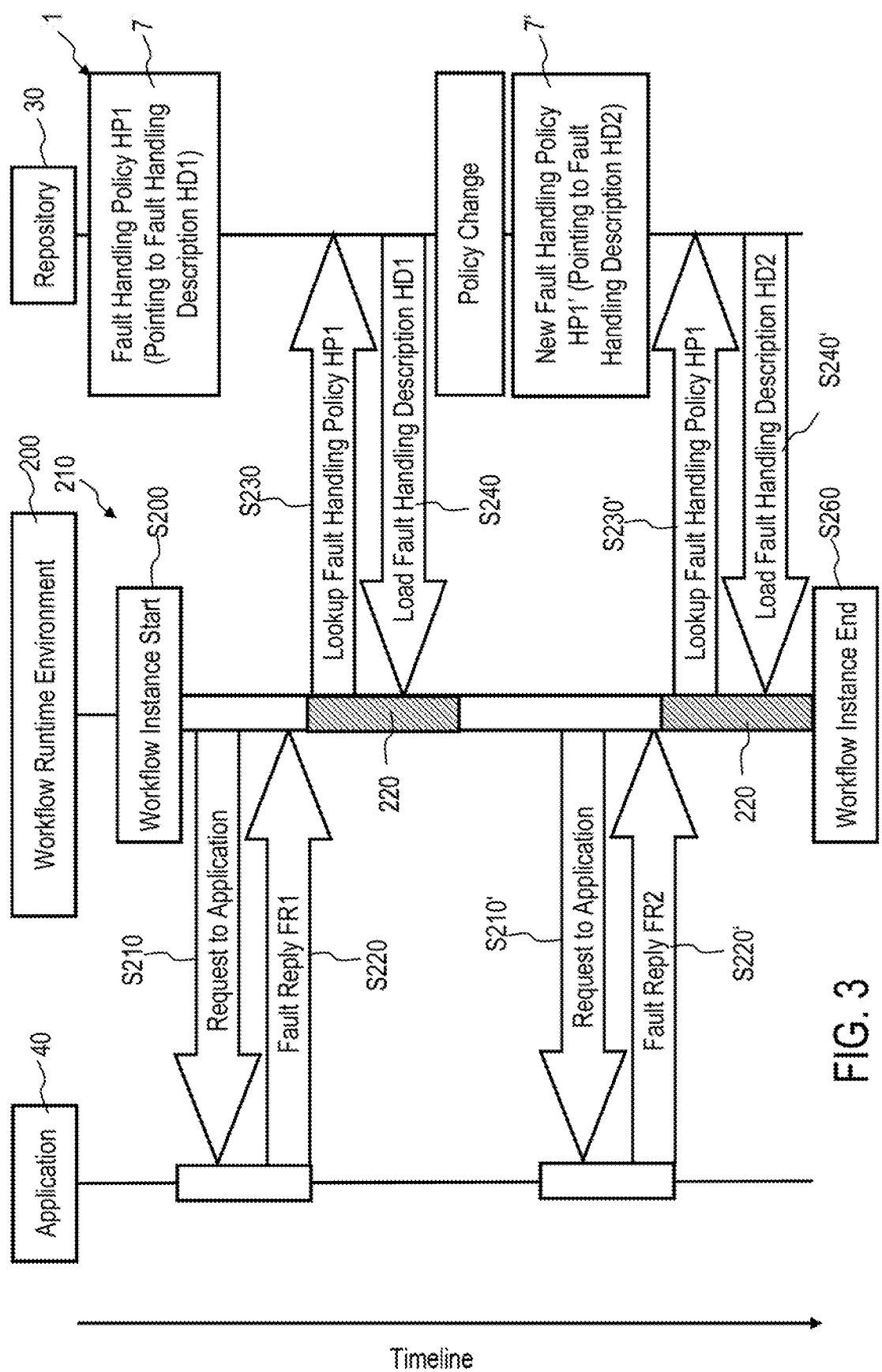
FIG. 3 is a schematic timing diagram of a dynamic fault handling resolution at runtime, in accordance with an embodiment of the present invention.

Referring to FIGS. 1-3, the shown embodiment of the present invention employs an arrangement for fault handling in a distributed IT environment 1. The distributed IT environment 1 comprises an integrated development environment (IDE) 100 for developing at least one workflow application 210; a repository 30 comprising an enterprise systems registry 32 and a fault handling descriptions catalogue 34; a workflow runtime environment 200 for executing at least one workflow application 210 interacting with the at least one application 40 by using interface information about the at least one application 40 stored in the enterprise systems registry 32.

Referring to FIG. 1, a developer 3 is loading at least one service definition 5 in the enterprise systems registry 32. Based on the at least one loaded service definition 5 at least one fault handling policy 7 is defined and loaded in the enterprise systems registry 32. Additional at least one fault handling description 9 which is written in an implementation-independent meta language by the developer 3 using a fault handling description editor, for example, is stored in the fault handling descriptions catalogue 34. The at least one fault handling policy 7 is logically linked to at least one fault handling description 9. So one fault handling policy 7 references 0 to n fault handling descriptions 9, and one fault handling description 9 may be referenced by 0 to m fault handling policies 7. Due to the n:m linking between the at least one defined fault handling policy 7 and the at least one fault handling description 9 the interface information about the at least one application 40 is associated with the at least one fault handling description 9 based on at least one defined fault handling policy 7, which is created based on at least one service definition 5 and stored in said enterprise systems registry 32. Embodiments of the present invention allow the developer 3 to query fault handling policy 7 based on service interface information and to apply an associated fault handling description 9 for a given service invocation.

Still referring to FIG. 1, the developer 3 imports the service definition 5 from the enterprise systems registry 32 into the integrated development environment 100. The integrated development environment 100 uses a fault handling policy lookup component 52 to look up a fault handling policy 7, based on the service definition including particular system information (e.g. endpoint, type of system, etc.). Further the integrated development environment 100 uses a fault handling logic generator 54 to generate a fault handler 220 for a dynamic fault handling execution at runtime for a particular execution language of the corresponding fault handling description 9 based on at least one imported service definition 5, and at least one fault handling policy 7 which is based on the imported service definition 5. The integrated development environment 100 implements the generated fault handler 220 in the workflow application 210 for interpreting and executing a particular execution language of the corresponding fault handling description 9. When the workflow application 210 is deployed to the workflow runtime environment 200 and the fault handler 220 is triggered, it dynamically looks up the fault handling description 9, which is based on the fault handling policy 7 and interprets the fault handling description 9.

Embodiments of the present invention allow self-adaptive determination of a fault handling strategy for a service invocation based on the fault handling policy 7, and self-adaptive selection of an externally defined fault handling logic described in the fault handling description Meta language based on previously determined fault handling logic.

Referring to FIG. 2, the workflow runtime environment 200 retrieves at least one associated fault handling description 9 from the fault handling descriptions catalogue 34 based on at least one fault handling policy 7, and interprets and executes a particular meta language code of the at least one associated fault handling description 9 in order to continue the defined workflow application 210 if a fault response from the at least one application 40 is received. Thus, the workflow runtime environment 200 performs a dynamic loading and interpretation of a fault handling description metadata information during process execution by the generated fault handling implementation. It is important to understand that this allows the use of new, published versions of existing error and/or fault handlers or entirely new error and/or fault handlers without requiring an adjustment and re-deployment of the application 40 or the workflow application 210.

Referring to FIG. 3, the workflow runtime environment 200 starts a workflow instance of the workflow application 210 in step S200. In step S210 a request is sent to the application 40. In step S220 a first fault reply FR1 is received from the application 40 which triggers the fault handler 220. In step S230 the fault handler 220 performs a lookup of a corresponding first fault handling policy HP1 which is stored as fault handling policy 7 in the repository 30 and points to a first fault handling description HD1. Based on the first fault handling policy, HP1, the first fault handling description HD1 is loaded to the fault handler 220 in step S240. The fault handler 220 interprets and executes the particular Meta language code of the first fault handling description HD1 in order to continue the defined workflow application 210. In continuation of the workflow application 210 a further request is sent to the application 40 in step S210'. In step S220' a second fault reply FR2 is received from the application 40 which again triggers the fault handler 220. In step S230' the fault handler 220 performs a lookup of a corresponding first fault handling policy HP1 which is stored as fault handling policy 7 in the repository 30. Since a policy change was performed between the steps S240 and S230' of the workflow application 210, a new first fault handling policy HP1', which is stored as fault handling policy 7' in the repository 30, is now pointing to a second fault handling description HD2. Based on the new first fault handling policy HP1' the second fault handling description HD2 is loaded to the fault handler 220 in step S240'. The fault handler 220 interprets and executes the particular Meta language code of the second fault handling description HD1' in order to continue the defined workflow application 210. In step S260 the present workflow instance is ended. Over the lifetime of the workflow application 210 or the application 40 the fault handlers 220 might change since a new version of an existing fault handling description 9 or an entirely new set of fault handling descriptions 9 might be available and dynamically bound without interrupting the running application 40 or the running workflow instance of the workflow application 210.

Embodiments of the present invention may use Web Sphere Integration Developer as an example for the integrated process development environment 100; and WebSphere Services Registry and Repository (WSRR) as an Enterprise Systems Registry 32 and as a fault handling description catalog 34.

The integrated development environment WebSphere Integration Developer (WID) is a development tool that allows the modeling, implementation, and deployment of BPEL processes for the Web Sphere Process Server BPEL runtime environment. The Web Sphere Integration Developer itself is built on top of an Eclipse framework, which is an open framework with a strong plugin concept. The plugin concept enables developing of on-top functionality for any software that uses Eclipse framework as a basis. By this mechanism an integration of the Web Sphere Integration Developer with an enterprise systems registry can be developed.

The WebSphere Services Registry and Repository can store artifacts such like WSDL files, XSDs, WS-Policy documents or any other XML file. It also supports storing service component development language (SCDL) and BPEL documents. The Web Sphere Services Registry and Repository also allows storing of additional metadata for above artifacts, using the classification system or properties like user-defined key-value pairs. The WebSphere Services Registry and Repository can be interacted with all stages of a SOA lifecycle. It can be used during design and development as well as by runtime applications. The WebSphere Services Registry and Repository provides both Java and Web services interface for searching, updating, creating and deleting service description and associated metadata. Based on these capabilities it is shown by the following example how an enterprise systems registry 32 and a fault handling descriptions catalog 34 might be realized.

Embodiments of the present invention assume that fault handling policies 7 are maintained in a policy registry (e.g.

together with the service definitions). Fault handling policies 7 could be realized in the form of properties that are attached to a service interface. For example, the Web Sphere Services Registry & Repository (WSRR) allows attaching of arbitrary properties to WSDL service interfaces and offers a graphical user interface and APIs to create and maintain these properties.

Furthermore, embodiments of the present invention assume that fault handling logic is described in an adequate format and made available in a fault handling description store/repository. Whilst the fault handling description itself is not part of this disclosure, the following explanations of a possible solution outline an exemplary approach to define a fault handling description Meta language, shown in FIG. 4.

A possible solution implementation could leverage the Eclipse plug-in concept to add additional functionality to the integrated development environment Web Sphere Integration Developer (WID). Furthermore, in this solution, the WebSphere Service Registry & Repository (WSRR) serves as a service registry (for service definitions), fault handling policy store, and fault handling description repository. The WebSphere Services Registry and Repository disposes of a query API that leverages XPath to retrieve stored properties, etc.

When the process developer models a service invocation and creates a fault handler, the plugin could send an API query to the WebSphere Services Registry and Repository, requesting the fault handling policies for the given service. The policy information would serve to parameterize any platform-specific fault handling processing code, which would then load and execute the actual fault handling description accordingly.

Figure 4:
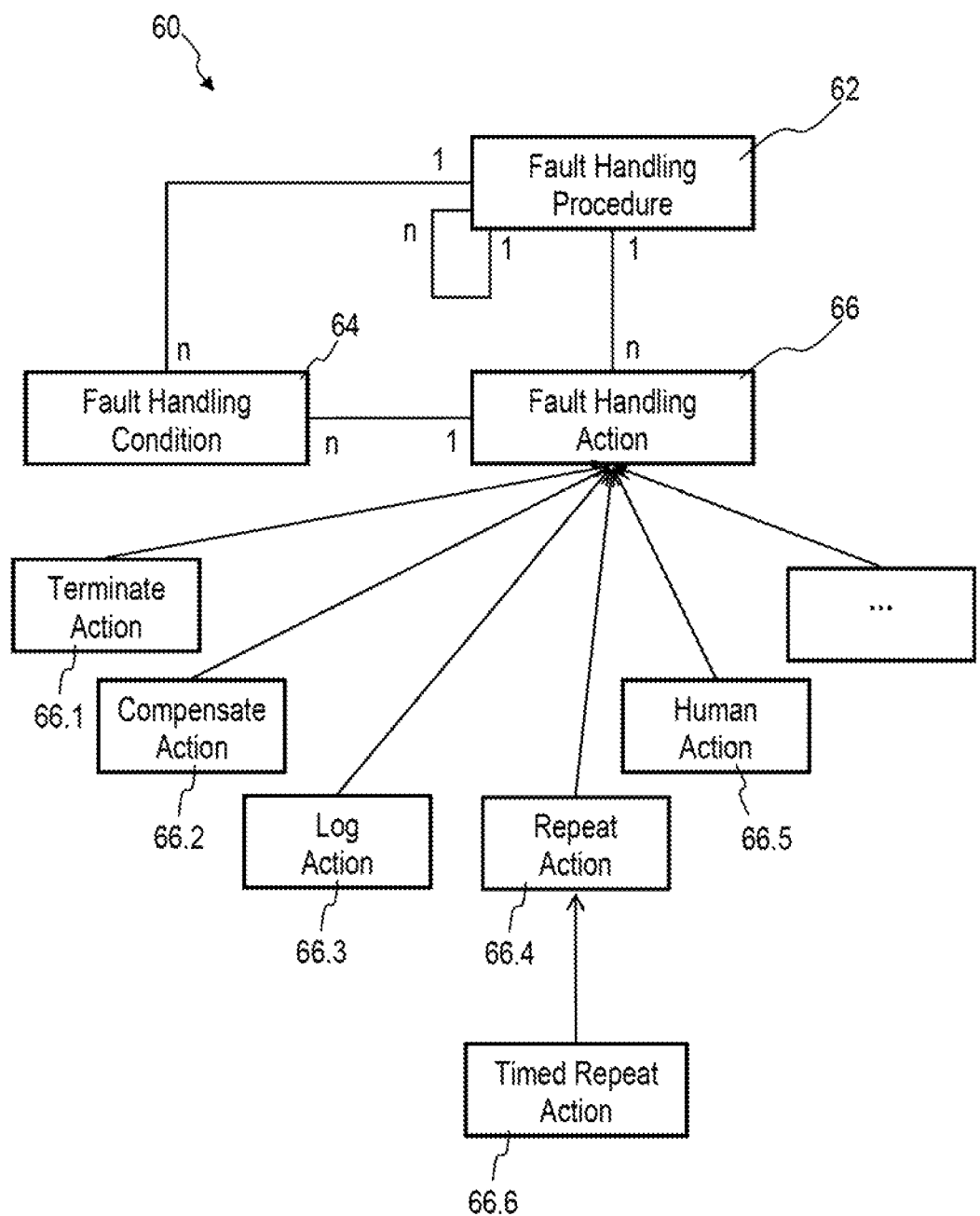
FIG. 4 is a schematic block diagram of a definition of a fault handling description Meta language, in accordance with an embodiment of the present invention.

Referring to FIG. 4, a fault handling description language 60 is defined, which is capable of describing common fault handling requirements of business process execution engines in a platform-independent format. For a sample implementation, an entity-based fault handling description language 60 is defined, which allows the description of fault handling procedures 62, fault handling actions 66 and associated fault handling conditions 64. The fault handling procedure 62 is the root element of the exemplary fault handling description language 60. The fault handling procedure 62 forms a flow construct that can contain an ordered list of fault handling actions 66 as well as other nested procedures. By embedding procedures into procedures, parallel fault handling activities can be specified. The fault handling action 66 is nested into a fault handling procedure 62 and forms a single step in the fault handling logic, such as termination 66.1, compensation 66.2, logging 66.3, repetition of an action 66.4, human intervention 66.5, etc. Each fault handling action 66 has its fixed position inside a fault handling procedures 62, meaning that the action (66) executes before or after other actions (for sequential execution). One or more fault handling conditions 64 can be attached to both fault handling procedures 62 and fault handling actions 66. Depending on the capabilities of the underlying rule language, fault handling procedures 62 and fault handling actions 66 can be executed conditionally based on process variables, calendars, priority, etc.

The fault handling description Meta language 60 could easily be extended by other entities and semantics, as long as the according extended fault handling interpretation logic is provided along with the extended language.

The generation of the fault handling logic for the target platform (here BPEL for the execution on Web Sphere Process Server) is the process of adapting the fault handling description meta information, which is stored in the fault handling descriptions catalog 34, to the particular target runtime platform (here WebSphere Process Server). In practice, this will mostly be the injection of static code that forms a complete parsing engine for all available entities in the fault handling description language 60.

In order to allow polymorphism of fault handling logic at runtime, the outcome of the generator 54 is executable and/or interpretable code in the target platform language (e.g. BPEL), that in turn dynamically loads the fault handling description meta information based on the previously looked-up fault handling policies 7, interprets this fault handling description 9, and executes the fault handling accordingly. This allows for the fault handling logic to change without the need of modifying, redeploying or even restarting the deployed application. The fault handling description language 60 forms the foundation for both the description and the interpretation logic.

Figure 5:
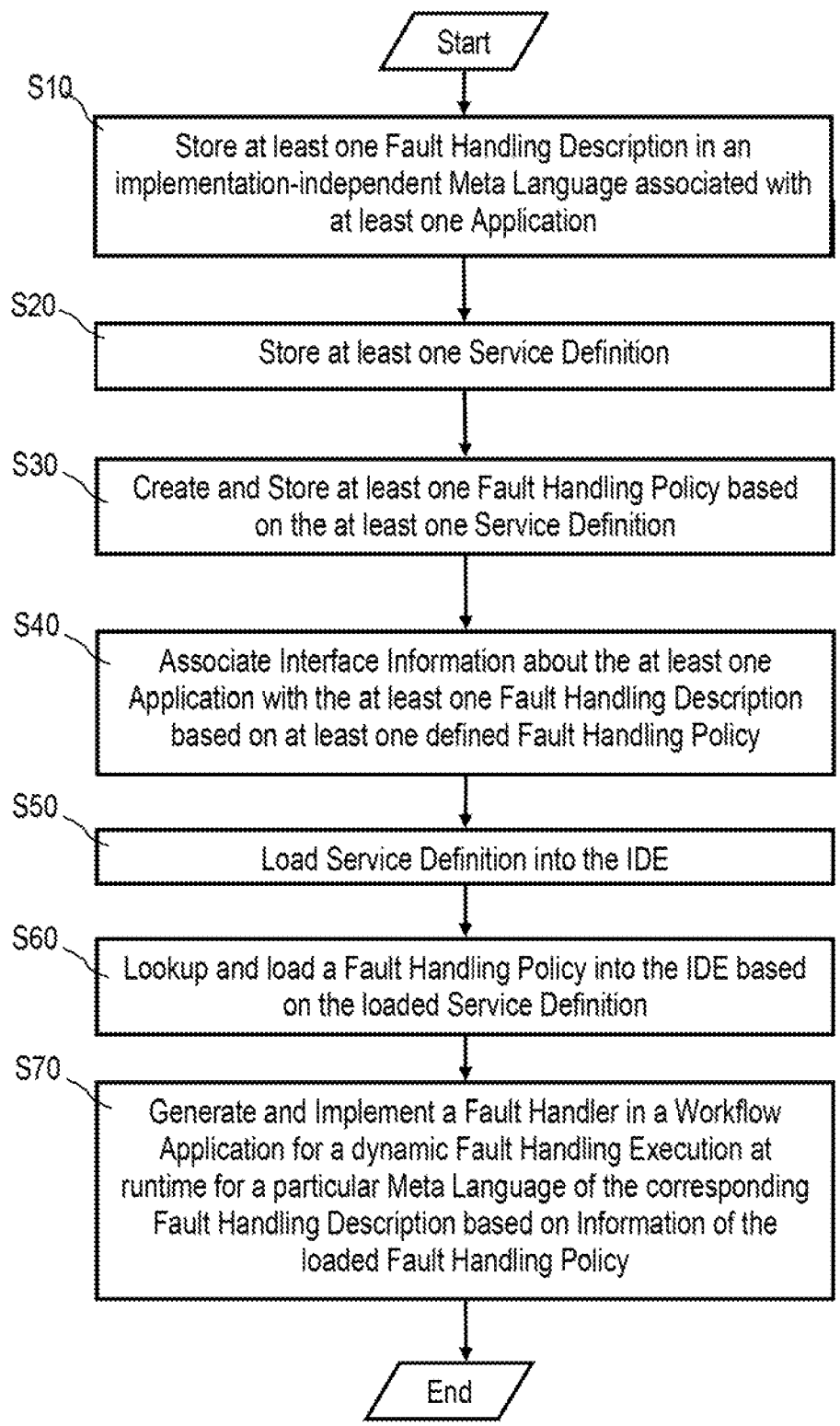
FIG. 5 is a schematic flow diagram of a first part of a method for fault handling in a distributed IT environment executed at development time, in accordance with an embodiment of the present invention.
Figure 6:
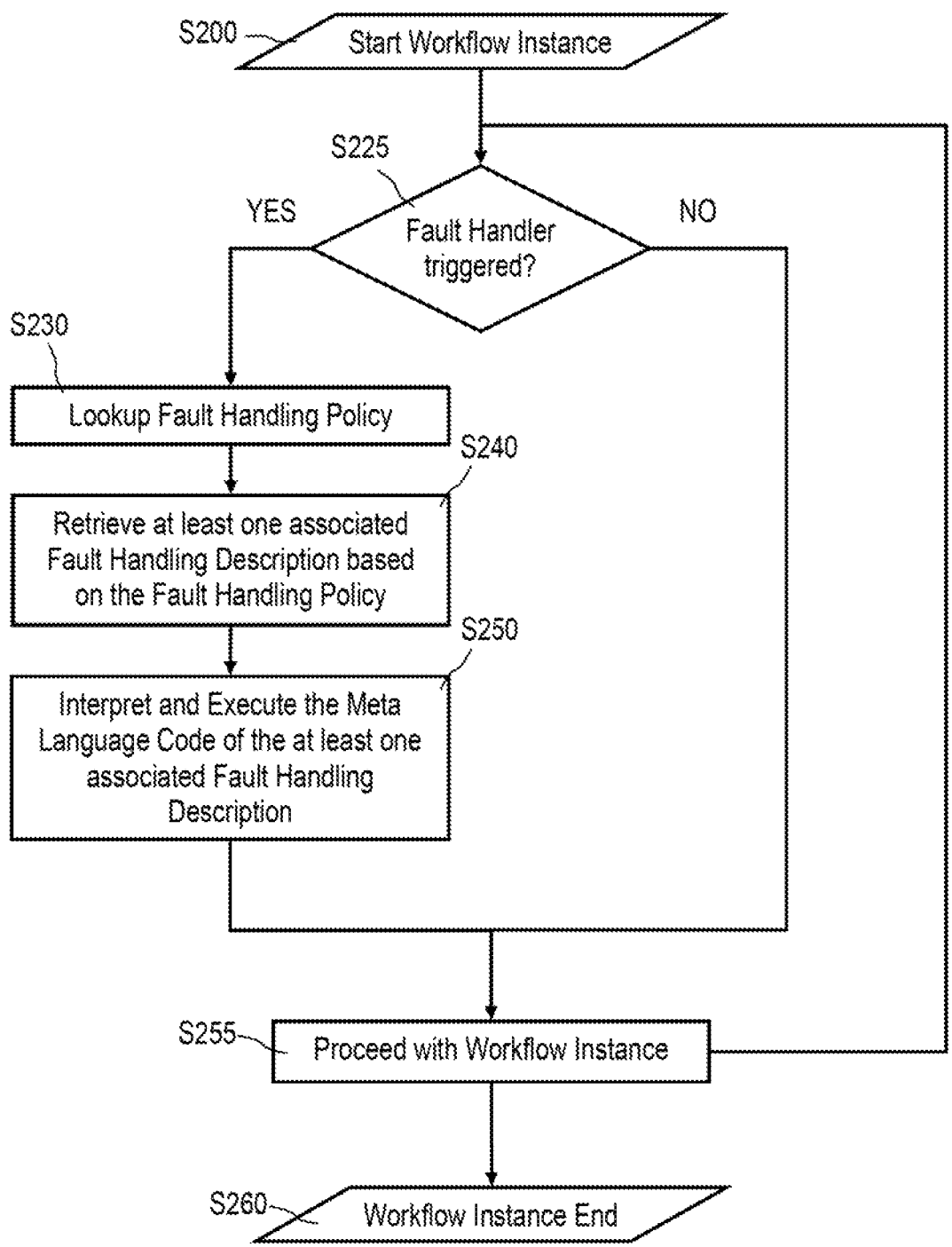
FIG. 6 is a schematic flow diagram of a second part of a method for fault handling in a distributed IT environment executed at runtime, in accordance with an embodiment of the present invention.

FIG. 5 shows a first part of a method for fault handling in a distributed IT environment executed at development time, in accordance with an embodiment of the present invention; and FIG. 6 shows a second part of a method for fault handling in a distributed IT environment executed at runtime, in accordance with an embodiment of the present invention.

Referring to FIG. 5, in step S10 at least one fault handling description 9 in an implementation-independent Meta language associated with the at least one application 40 is stored in enterprise systems registry 32. In step S20 at least one service definition 5 is stored in the enterprise systems registry 32. In step S30 at least one fault handling policy 7 is created based on the at least one service definition 5 and stored in the enterprise systems registry 32. In step S40 the interface information about the at least one application 40 is associated with the at least one fault handling description 9 based on at least one defined fault handling policy 7. In step S50 the service definition 5 is loaded to the integrated development environment (IDE) 100. Based on the loaded service definition 5, a corresponding fault handling policy 7 is looked up and loaded to the integrated development environment 100 in step S60. In step S70 a fault handler 220 is generated for a dynamic fault handling execution at runtime for a particular execution language of the corresponding fault handling description 9. The fault handler 220 is generated based on information of the loaded fault handling policy 7, and the generated fault handler 220 is implemented in the workflow application 210.

Referring to FIG. 6, in step S200 a workflow instance of the workflow application 210 is started. In Query S225 a check is made whether the fault handler 220 is triggered or not. If the fault handler 220 is not triggered, the workflow instance of the workflow application 210 is continued in step S255. If the fault handler 220 is triggered, a fault handling policy 7 is looked up in step S230. Based on the looked up fault handling policy 7 at least one associated fault handling description 9 is retrieved in step S240. In step S250 the Meta language code of the at least one fault handling description 9 is interpreted and executed. In step S255 the workflow instance of the workflow application 210 is continued. During the executing the workflow instance the query S225 may be repeated. The workflow instance of the workflow application 210 may be finished in step S260.

The inventive method for fault handling in a distributed IT environment can be implemented as an embodiment containing both hardware and software elements. In a preferred embodiment, the present invention is implemented using software executing on a hardware processing device, and the software includes but is not limited to firmware, resident software, microcode, etc.

Furthermore, the present invention can take the form of a computer program product accessible from a computer-usable or computer-readable medium/device providing program code for use by or in connection with a computer or any instruction execution system. For the purposes of this description, a computer-usable or computer-readable medium/device can be any apparatus that can contain, store, or communicate the program for use by or in connection with the instruction execution system, apparatus, or device.

The medium can be an electronic, magnetic, optical, electromagnetic, infrared, or semiconductor storage medium (system or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A computer implemented method for fault handling in a IT environment having a workflow runtime environment that executes at least one workflow application interacting with at least one application by using interface information about the at least one application, the computer implemented method comprising:
    storing, within an enterprise systems registry of an externalized storage repository, fault handling descriptions in an implementation-independent meta language, wherein the implementation-independent meta language describes the externalized storage repository, wherein the implementation-independent meta language is associated with the at least one application, and wherein the externalized storage repository is located external to the workflow application;
    associating the interface information about the at least one application with one or more of the fault handling descriptions based on a fault handling policy which is created based on at least one service definition, wherein the fault handling policy corresponds to a particular fault response;
    adapting meta information of one or more fault handling descriptions that are pointed to by the fault handling policy to the workflow runtime environment in order to generate a fault handler, wherein the fault handler is executable and interpretable in a specific target platform language associated with the workflow runtime environment, and wherein the implementation-independent meta language is different from the specific target platform language;
    in response to receiving a first instance of a fault response from the at least one application, the fault handler performing a first lookup, within the externalized storage repository, of the fault handling policy corresponding to the fault response, wherein the fault handling policy points to a first one or more fault handling descriptions within a fault handling descriptions catalogue of the externalized storage repository, and wherein the fault handling policy is centrally defined and maintained within the externalized storage repository for a plurality of systems;
    the fault handler dynamically interpreting the first one or more fault handling descriptions at runtime and performing a fault handling using the first one or more fault handling descriptions to continue execution of the at least one workflow application;
    in response to receiving a second instance of the fault response from the at least one application, the fault handler performing a second lookup of the fault handling policy within the externalized storage repository, wherein the fault handling policy has been updated within the externalized storage repository, after the first lookup, to point to a second one or more fault handling descriptions that are different from the first one or more fault handling descriptions; and
    the fault handler dynamically interpreting the second one or more fault handling descriptions at runtime and performing a fault handling using the second one or more fault handling descriptions to continue execution of the at least one workflow application.

2. The computer implemented method according to claim 1, further comprising:
    in response to loading the second one or more fault handling descriptions, dynamically loading one or more additional fault handlers from among: one or more updated versions of the fault handler and one or more entirely new fault handlers; and
    dynamically performing a self-adaptive selection of an externally defined fault handling logic described in one or more fault handling descriptions that are pointed to by the fault handling policy, wherein the fault handling logic comprises at least one fault handling procedure, wherein any changes to the at least one fault handling procedure are dynamically applied to all running process instances of the IT environment.

3. The computer implemented method according to claim 1, wherein the interface information is associated with the at least one application without interrupting the at least one workflow application or the at least one application, wherein the fault handling policy is centrally defined and maintained in the externalized storage repository for at least one of: single service operations and entire services, a class or type of same or similar enterprise information systems, and a particular enterprise information service.

4. The computer implemented method according to claim 1, further comprising:
    in response to receiving at least one policy change to the fault handling policy during runtime of the at least one workflow application:
        creating at least one modified fault handling policy that incorporates the at least one policy change into the fault handling policy; and
        pointing the fault handling policy to the at least one modified fault handling policy within the externalized storage repository, wherein the at least one modified fault handling policy points to the second one or more fault handling descriptions; and in response to the fault handler performing the second lookup of the fault handling policy, dynamically loading the second one or more fault handling descriptions that are associated with the at least one modified fault handling policy.

5. The computer implemented method of claim 1, wherein each fault handling policy is a property attached to a particular service interface and is created and maintained via a graphical user interface and associated application program interfaces (APIs) associated with the fault handling descriptions catalogue.

6. The computer implemented method of claim 1, wherein the fault handling descriptions interpreted by the fault handler at runtime to perform fault handling may be changed at any time during a lifetime of the at least one workflow application and the at least one application without interrupting, modifying, redeploying, and restarting the at least one application and at least one workflow application.

7. A system for fault handling in an IT environment comprising:

an externalized storage repository having a fault handling descriptions catalogue comprising a plurality of fault handling descriptions; and a processor executing a workflow runtime environment for developing and executing at least one workflow application and interacting with at least one application using interface information about the at least one application, wherein the workflow runtime environment:

stores, within an enterprise systems registry of the externalized storage repository, the plurality of fault handling descriptions in an implementation-independent meta language, wherein the implementation-independent meta language describes the externalized storage repository, wherein the implementation-independent meta language is associated with the at least one application, and wherein the externalized storage repository is located external to the at least one workflow application;

associating the interface information about the at least one application with one or more of the plurality of fault handling descriptions based on a fault handling policy which is created based on at least one service definition, wherein the fault handling policy corresponds to a particular fault response, and wherein the fault handling descriptions that are interpreted by a fault handler at runtime to perform the fault handling may be changed at any time during a lifetime of the at least one workflow application and the at least one application without interrupting, modifying, redeploying, and restarting the at least one application and at least one workflow application;

adapts meta information of one or more fault handling descriptions that are pointed to by the fault handling policy to the workflow runtime environment in order to generate the fault handler, wherein the fault handler is executable and interpretable in a specific target platform language associated with the workflow runtime environment, and wherein the implementation-independent meta language is different from the specific target platform language;

in response to receiving a first instance of a fault response from the at least one application, performs, using the fault handler, a first lookup of the fault handling policy corresponding to the fault response within a fault handling descriptions catalogue of the externalized storage repository, wherein the fault handling policy points to a first one or more fault handling descriptions, and wherein the fault handling policy is centrally defined and maintained within the externalized storage repository for a plurality of systems;

dynamically interprets the first one or more fault handling descriptions at runtime and performs, by the fault handler, a fault handling using the first one or more fault handling descriptions to continue execution of the at least one workflow application;

in response to receiving a second instance of the fault response from the at least one application, performs, using the fault handler, a second lookup of the fault handling policy within the fault handling descriptions catalogue, wherein the fault handling policy has been updated within the fault handling descriptions catalogue, after the first lookup, to point to a second one or more fault handling descriptions that are different from the first one or more fault handling descriptions;

dynamically interprets the second one or more fault handling descriptions at runtime; and performs, by the fault handler, a fault handling using the second one or more fault handling descriptions to continue execution of the at least one workflow application.

8. The system according to claim 7, wherein the workflow runtime environment:

in response to loading the second one or more fault handling descriptions, dynamically loads one or more additional fault handlers from among: one or more updated versions of the fault handler and one or more entirely new fault handlers; and dynamically performs a self-adaptive selection of an externally defined fault handling logic described in one or more fault handling descriptions that are pointed to by the fault handling policy, wherein the fault handling logic comprises at least one fault handling procedure, wherein any changes to the at least one fault handling procedure are dynamically applied to all running process instances of the IT environment.

9. The system according to claim 7, wherein the interface information is associated with the at least one application without interrupting the at least one workflow application or the at least one application, wherein the fault handling policy is centrally defined and maintained in the fault handling descriptions catalogue for at least one of: single service operations and entire services, a class or type of same or similar enterprise information systems, and a particular enterprise information service.

10. The system according to claim 7, wherein the workflow runtime environment:

in response to receiving at least one policy change to the fault handling policy during runtime of the at least one workflow application, creates at least one modified fault handling policy that incorporates the at least one policy change into the fault handling policy and pointing the fault handling policy to the at least one modified fault handling policy within the fault handling descriptions catalogue, wherein the at least one modified fault handling policy points to the second one or more fault handling descriptions; and in response to the fault handler performing the second lookup of the fault handling policy, dynamically loads the second one or more fault handling descriptions that are associated with the at least one modified fault handling policy.

11. The system according to claim 7, wherein each fault handling policy is a property attached to a particular service interface and is created and maintained via a graphical user interface and associated application program interfaces (APIs) associated with the fault handling descriptions catalogue.

12. A computer program product stored on a non-transitory computer readable storage device and comprising computer-readable program code that when run on a computer causes the computer to perform a method for fault handling in an IT environment, the IT environment having a workflow runtime environment that executes at least one workflow application that is interacting with at least one application by using interface information about the at least one application, the method comprising:
  storing, within an enterprise systems registry of an externalized storage repository, the fault handling descriptions in an implementation-independent meta language, wherein the implementation-independent meta language describes the externalized storage repository, wherein the implementation-independent meta language is associated with the at least one application, and wherein the externalized storage repository is located external to the at least one workflow application;
  associating the interface information about the at least one application with one or more of the fault handling descriptions based on the fault handling policy which is created based on at least one service definition, wherein the fault handling policy corresponds to a particular fault response, and wherein the fault handling descriptions that are interpreted by a fault handler at runtime to perform the fault handling may be changed at any time during a lifetime of the at least one workflow application and the at least one application without interrupting, modifying, redeploying, and restarting the at least one application and at least one workflow application;
  adapting meta information of one or more fault handling descriptions that are pointed to by the fault handling policy to the workflow runtime environment in order to generate the fault handler, wherein the fault handler is executable and interpretable in a specific target platform language associated with the workflow runtime environment, and wherein the implementation-independent meta language is different from the specific target platform language;
  in response to receiving a first instance of a fault response from the at least one application, performing, via the fault handler of the workflow runtime environment, a first lookup of a fault handling policy corresponding to the fault response within a fault handling descriptions catalogue of the externalized storage repository, wherein the fault handling policy points to a first one or more fault handling descriptions, and wherein the fault handling policy is centrally defined and maintained within the externalized storage repository for a plurality of systems;
  dynamically interpreting, by the fault handler, the first one or more fault handling descriptions at runtime and performing a fault handling using the first one or more fault handling descriptions to continue execution of the at least one workflow application;
  in response to receiving a second instance of the fault response from the at least one application, performing, via the fault handler, a second lookup of the fault handling policy within the fault handling descriptions catalogue, wherein the fault handling policy has been updated after the first lookup to point to a second one or more fault handling descriptions that are different from the first one or more fault handling descriptions; and
  dynamically interpreting, by the fault handler, the second one or more fault handling descriptions at runtime and performing a fault handling using the second one or more fault handling descriptions to continue execution of the at least one workflow application.

13. The computer program product of claim 12, the program code further comprising code for:
  in response to loading the second one or more fault handling descriptions, dynamically loading one or more additional fault handlers from among: one or more updated versions of the fault handler and one or more entirely new fault handlers; and
  dynamically performing a self-adaptive selection of an externally defined fault handling logic described in one or more fault handling descriptions that are pointed to by the fault handling policy, wherein the fault handling logic comprises at least one fault handling procedure, wherein any changes to the at least one fault handling procedure are dynamically applied to all running process instances of the IT environment.

14. The computer program product of claim 12, wherein the interface information is associated with the at least one application without interrupting the at least one workflow application or the at least one application, wherein the fault handling policy is centrally defined and maintained in the fault handling descriptions catalogue for at least one of: single service operations and entire services, a class or type of same or similar enterprise information systems, and a particular enterprise information service.

15. The computer program product of claim 12, the program code further comprising code for:
  in response to receiving at least one policy change to the fault handling policy during runtime of the at least one workflow application, creating at least one modified fault handling policy that incorporates the at least one policy change into the fault handling policy and pointing the fault handling policy to the at least one modified fault handling policy within the fault handling descriptions catalogue, wherein the at least one modified fault handling policy points to the second one or more fault handling descriptions; and
  in response to the fault handler performing the second lookup of the fault handling policy, dynamically loading the second one or more fault handling descriptions that are associated with the at least one modified fault handling policy;
  wherein each fault handling policy is a property attached to a particular service interface and is created and maintained via a graphical user interface and associated application program interfaces (APIs) associated with the fault handling descriptions catalogue.

* * * * *